Nov. 15, 1960  G. MONNOT ET AL  2,960,079
OPERATION OF COMPRESSION IGNITION TYPE
INTERNAL COMBUSTION ENGINES
Filed May 15, 1958  15 Sheets-Sheet 15
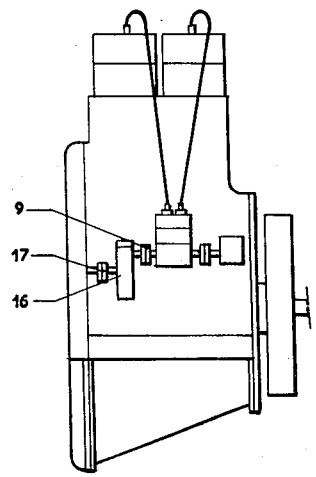
Fig._14
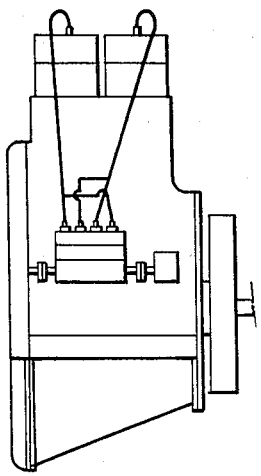
Fig._15
INVENTORS
GEORGES MONNOT
ROSTISLAV VICHNIEVSKY
BY: *Toulmin & Toulmin*
ATTORNEYS

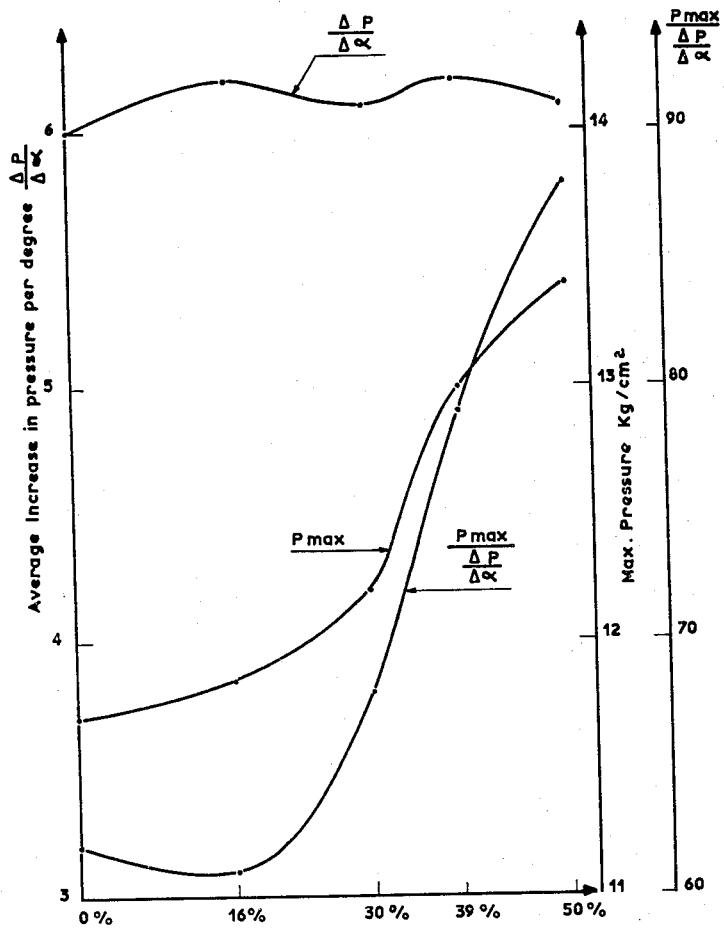
Fig._IA

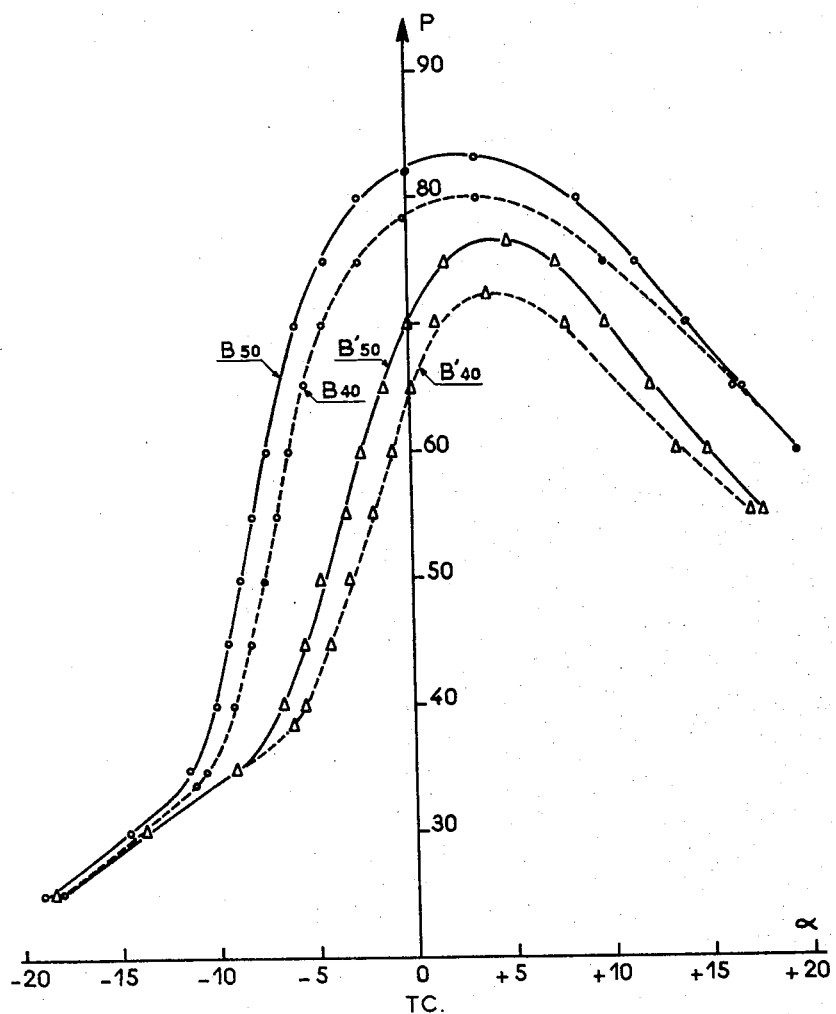
Fig._2

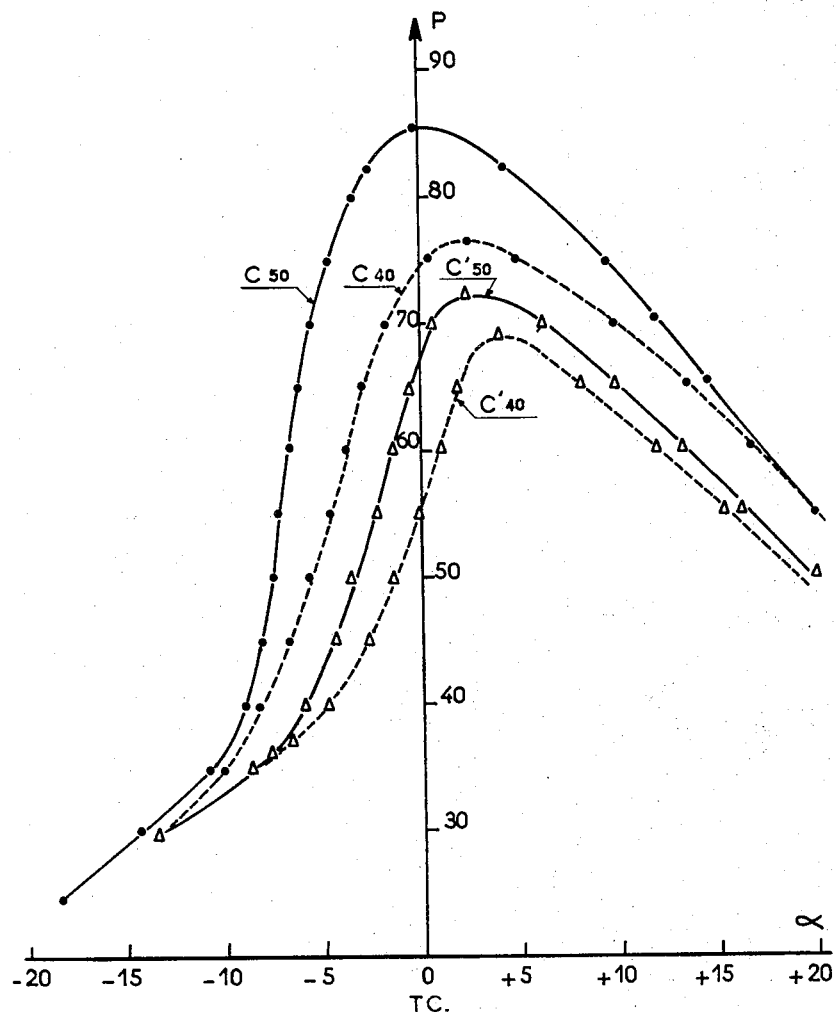
Fig._3

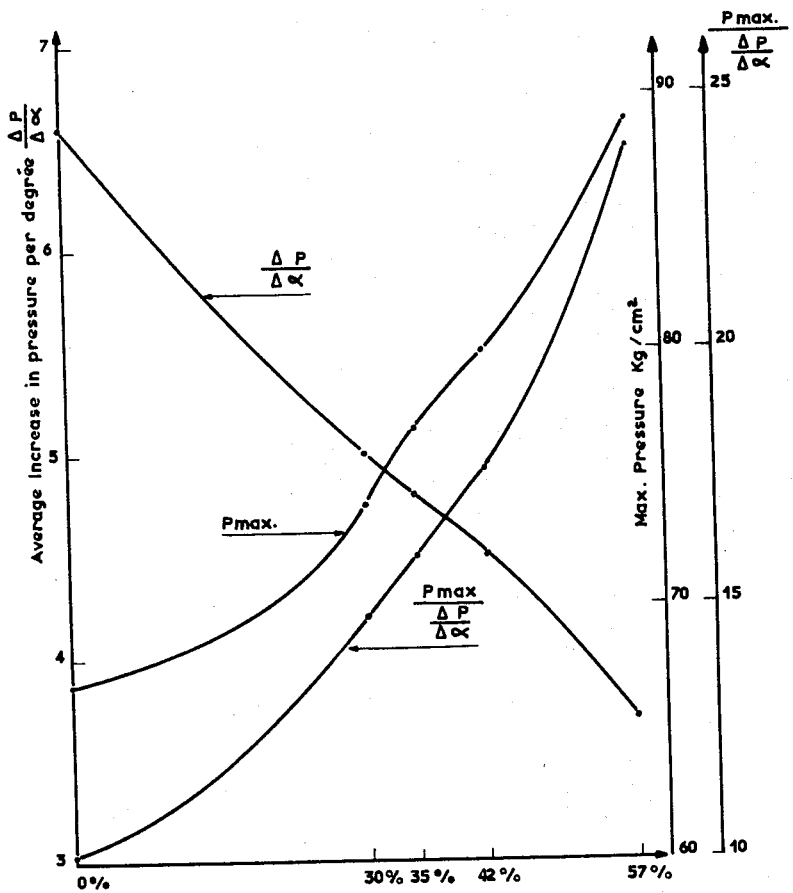
Fig.-IV.A

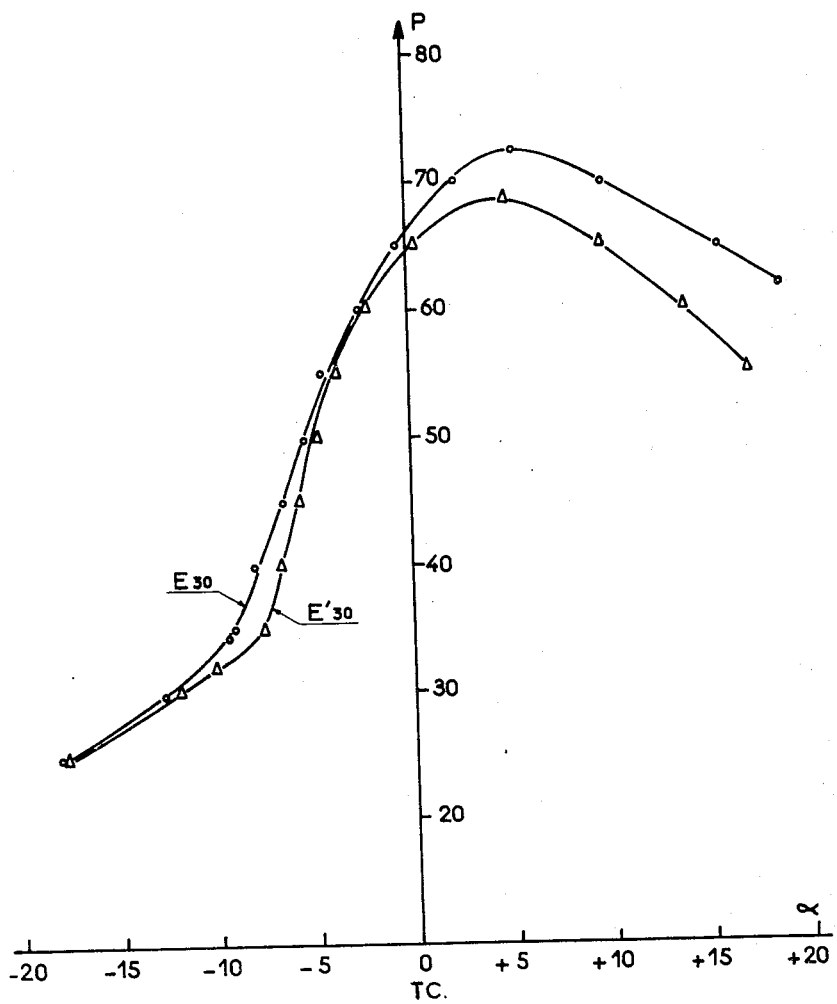
Fig._5

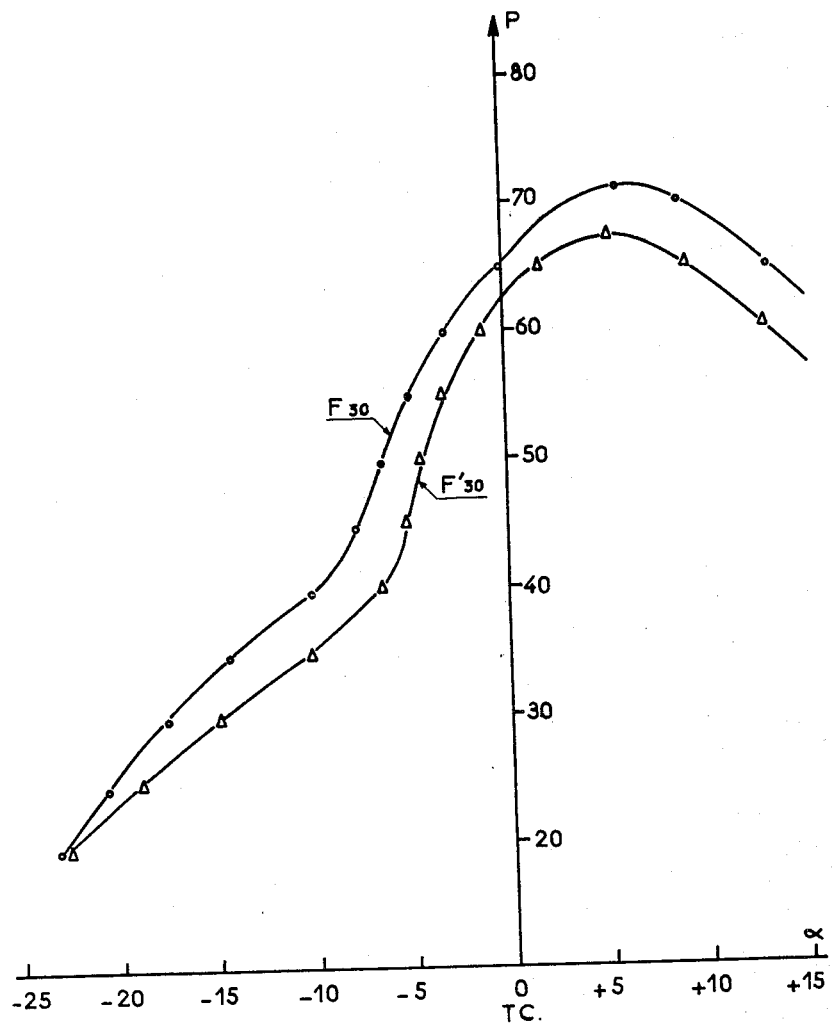
Fig_6

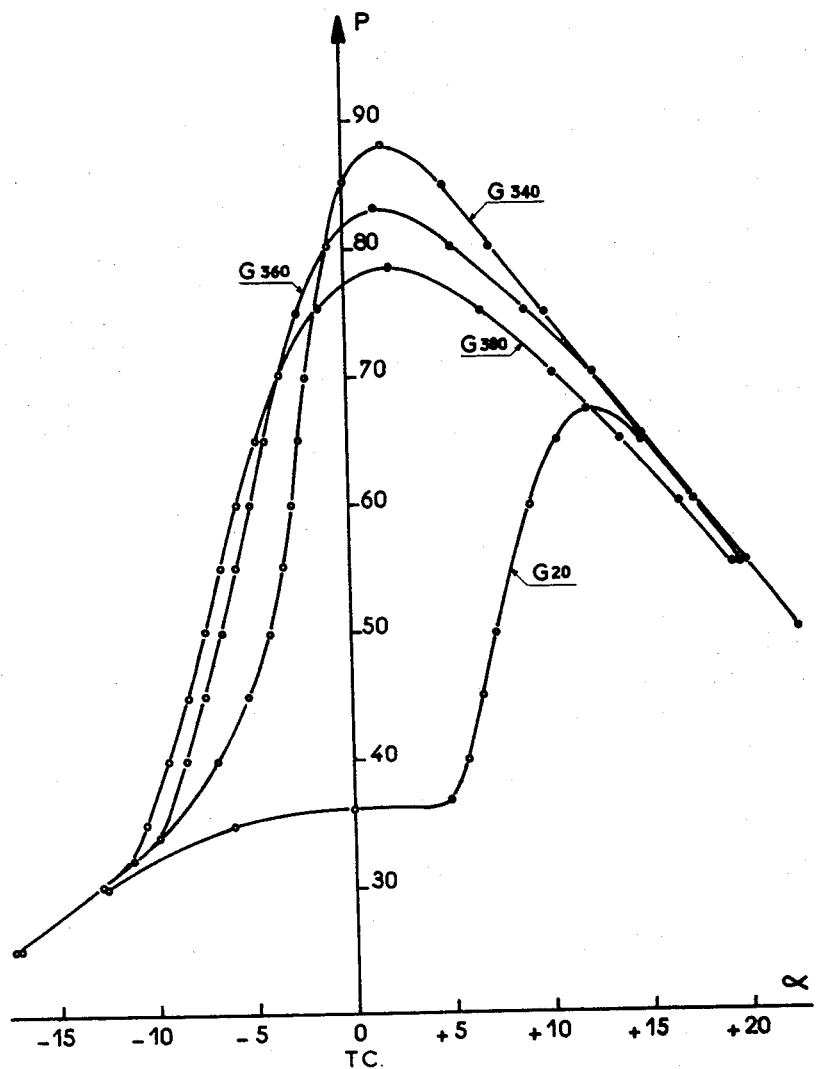
Fig._7

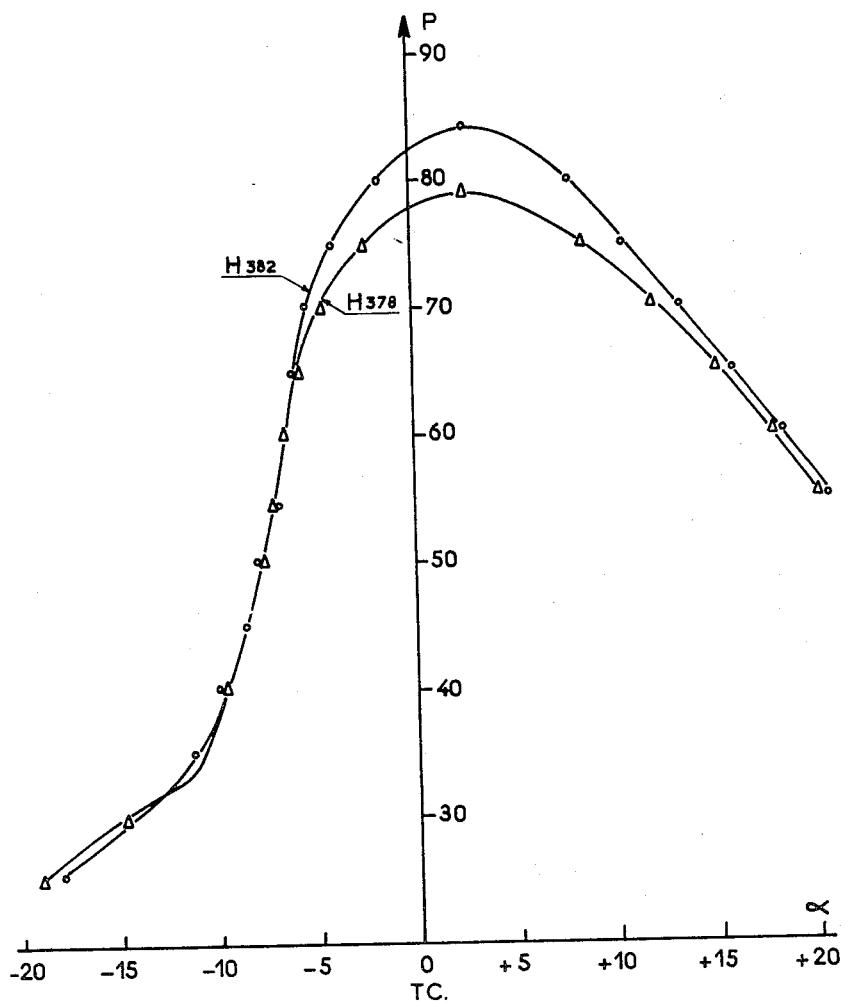
Fig._8

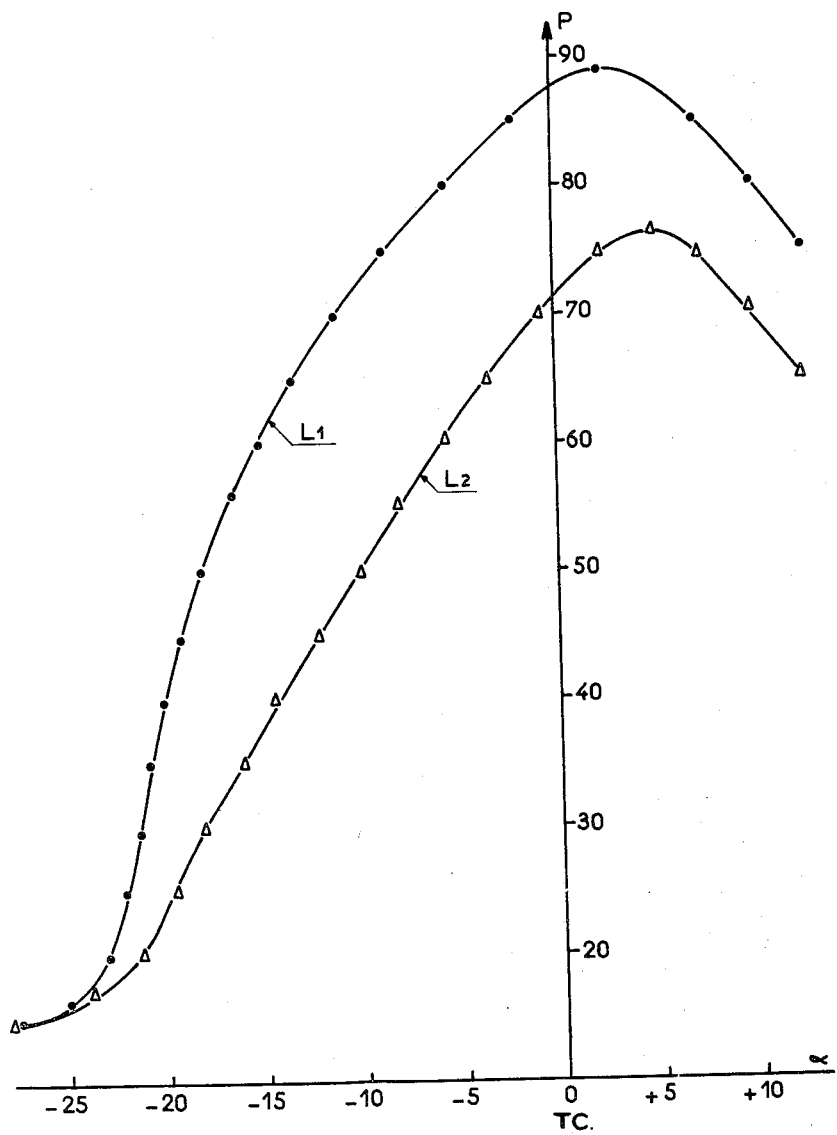
Fig._10

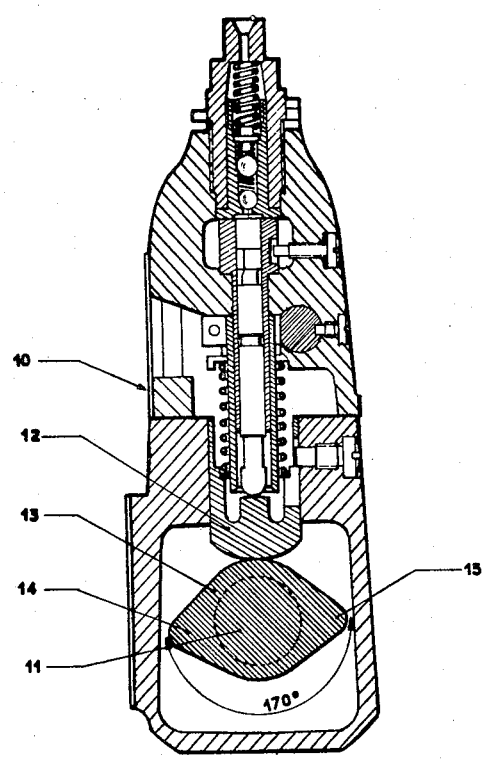
Fig._13

United States Patent Office 2,960,079
Patented Nov. 15, 1960

2,960,079

OPERATION OF COMPRESSION IGNITION TYPE INTERNAL COMBUSTION ENGINES

Georges Monnot and Rostislav Vichnievsky, Paris, France,, assignors to Institut Francais du Petrole des Carburants et Lubrifiants, Paris, France Filed May 15, 1958, Ser. No. 735,479

Claims priority, application France May 15, 1957

13 Claims. (Cl. 123—32)

This invention relates to improvements in the operation of internal combustion engines of the compression ignition type and more particularly to the operation of such engines by means of a novel method of double injection.

It is an object of our invention to provide for an improved method of operation of internal combustion engines of the compression ignition type in order to obtain a smoother combustion regardless of the type of fuel employed, and, contrary to the known methods, an increased power output at a given rate of pressure increase; it is a further object of our invention, to make it possible to run the compression ignition engines at higher speeds than conventionally and to feed them with fuels which are lighter than gas oil, for instance all types of gasoline including gasoline of high octane number, the use of which is normally limited to engines of the carburetor type.

The method of "pilot injection" is well-known in the art. This method comprises the injection of a small portion of a fuel charge ahead of the main injection in engines of the diesel type using diesel oil. It has been described for instance in "Automotive Industries," vol. 79 (1938), pp. 533–534 "What Can Be Gained by Pilot Injection," by Dr. P. H. Schweitzer.

Its purpose is to reduce the ignition lag of certain fuels, prevent knocking of the engine and raise the cylinder gas temperature sufficiently to promote rapid ignition. The portion of the total fuel charge injected as pilot charge is a relatively small part of the total charge and amounts to about 10% of the latter and according to the above mentioned publication it must not be more than 15% of the main charge if the best results are contemplated. The pilot charge is injected through the same injector as the main charge and at an angle of rotation of the crankshaft of about 10° to 40° prior to the main injection. According to Schweitzer the pilot spray must begin 10 to 15° before top center and the main spray must follow by 8 to 10°.

The same principle of operation forms the basis of the known "precarbureting" systems which comprise the replacement of the combustion-sustaining agent, such as air, in compression ignition type engines by a homogenized mixture of air and carburant, which mixture only contains a proportion of the latter insufficient for complete combustion, so that a voluntary ignition and explosion of this mixture is not possible.

As has been stated before, these known methods serve to make smoother the operation of the engine by reducing to a certain degree the ignition lag occurring in engines of the compression ignition type.

In fact, the break, or sudden rise in the curve representing the compression-time diagram at the instant of ignition depends upon lag which in turn depends on the nature of the used fuel. When using a fuel of a given type having a given ignition lag, the best power output will be achieved by advancing the ignition time sufficiently so as to provide that maximum pressure be obtained in the vicinity of the top center position of the crankshaft and consequently the piston of a cylinder.

However, this advance of the injection entails an abrupt change in the slope of the curve representing the pressure-time diagram which change is particularly detrimental to the mechanism of the engine.

It has therefore already been proposed to smooth out the rise in pressure in the aforesaid diagram and obtain a more gradual pressure increase at the same length of injection time and thereby to reduce the otherwise inevitable wear of the engine, by advancing the beginning of the injection by a much smaller angular interval taken from the top center so as to permit on the one hand, that the ignition occur somewhat later and, on the other hand that the rise in pressure be limited due to the influence of the expansion which takes place during a part of the combustion. However, this has the very serious drawback that the combustion itself takes place during the initial part of the expansion stroke, and consequently leads to a substantial loss of power due to an insufficient expansion.

This is, for instance, the case when operating a diesel engine in the manner described in "Automotive Industries" hereabove cited.

In fact, all known methods having the object of making the operation of compression ignition type internal combustion engines smoother by reducing the time lag between the beginning of the injection and the ignition and avoiding knocking of the engine suffer from the aforementioned drawback of a considerable loss in power output.

These drawbacks are avoided and the objects of our invention of obtaining an increased power output at a given rate of pressure increase under otherwise the same conditions of operation as in the known methods, and to make it possible to use in this type of engine light fuels such as gasoline having a high octane number with excellent power output, are achieved by the improved method according to our invention. This method comprises a double injection of fuel consisting of a first "carbureting" injection of a fraction of the fuel into the residual hot gases remaining in the combustion space of the cylinder toward the end of the exhaust stroke of a work-cycle and a second "igniting" injection in the cylinder toward the end of the compression stroke of the next work-cycle, said injection amounting to the reminder of the fuel charge. The time interval between the "carbureting" and the "igniting" injections as well as the ratio of the amounts of the two injections are adjusted to the type of fuel, the time of opening of the intake valve of a given cylinder relative to the aforesaid two injections, and the dimensions and working speed of the engine, in such a manner that the chemical reactions taking place in the combustion space of an engine cylinder be so controlled that the resulting time lag between the injection of the igniting portion i.e. between the second of the two aforesaid injections, and the ignition itself is substantially reduced or entirely eliminated. This is achieved by timing the first and second injection relative to the opening of the intake valve of the cylinder and top center position of the crankshaft at the end of the compression stroke, so that the first injection takes place approximately by one full revolution of the crankshaft (360°) prior to the aforesaid top center position and the second injection takes place prior to top center, in the case of the air intake valve opening at approximately 12° prior to top center. In the known methods of pilot injection, the first injection takes place at approximately 8 to 10° prior to the position of the crankshaft in which the second injection occurs while the second main injection takes place in the vicinity of the top center, for instance 1 to 5 degrees prior to the latter (see P. H. Schweitzer hereabove mentioned).

The method according to the present invention is based on our discovery that the first or "carbureting" injection should be effected into the residual hot gases remaining in the combustion space of the cylinder toward the end of the exhaust stroke of the preceding work cycle, while the second or "igniting" injection of the remainder of the fuel should take place toward the end of the compression stroke and preferably at a position of the crankshaft prior to top center, and usually not closer than for instance 10° prior the lattter.

However it must be emphasized that the only essential condition necessary to obtain improved results according to this invention resides in injecting a first fraction of the total charge in the hot residual gases remaining in the cylinder toward the end of the exhaust stroke of the preceding work-cycle, provided that the second injection of the remaining fraction of the charge take place at such a position of the crankshaft that self-ignition of the total charge be possible.

We have found that, if these conditions are observed, the fuel injected at first in the combustion space of a compression ignition engine will be transformed before the second fuel injection occurs, toward such a chemical composition and such physical conditions of the gas mixture in the combustion space, that, at the time of the second injection, ignition of the gas mixture takes place practically instantaneously, as soon as the second injection occurs and it is followed by a smooth further combustion.

Thus, submitting the first of the two fuel portions to be injected successively during the work-cycle in each cylinder, to the elevated temperatures and the low oxygen content of the residual gases at the end of the exhaust stroke, said fuel portion is subjected to chemical reactions of cracking eventually accompanied by oxidation reactions, which reactions progress until fresh air is introduced into the cylinder and reduces the temperature of the gas mixture thereby chilling these reactions.

By timing the first and second injection relative to the work cycle of each cylinder of the engine in the manner described above, these reactions lead to a gas mixture, at the time of the second injection which permits to achieve for a given type of fuel the best possible compromise between an increase in the output rate and optimal conditions of ignition and combustion.

By a careful timing of the first injection, i.e. of the "carbureting fraction," in the method according to our invention, relative to the opening time of the air intake valve and by taking into account the specific type of engine and its working speed, it is then possible to control the reactions in the gas mixture originated by the first injection, so that, on the one hand, the ignition lag at the time of the second injection is substantially eliminated, and on the other hand, a self-ignition of the carbureting fraction prior to the main injection of the "igniting" fraction is avoided. A premature self-ignition of the gas mixture would lead to a loss of power and consequently an undesirable decrease of the engine output.

The intensity of the cracking and/or oxidation reactions is controlled in such a manner by a corresponding timing of the primary injection that the combustible mixture formed after the intake stroke and after certain chemical changes occurring during the compression stroke, is ignited substantially at the moment when the secondary or main injection takes place.

Careful observation of the conditions set forth above thus permits to reduce at will the ignition lag of any type of fuel used. If it is so desired, this ignition lag can be completely suppressed by a corresponding timing of the primary injection relative to the work cycle and to the opening time of the air intake valve for any given time interval between the first and the second or main injection, the latter being chosen conveniently within the limits set forth above so as to effect a progressive rise of pressure while preserving a satisfactory engine output. A pronounced reduction or complete elimination of the ignition lag will lead, of course, to a progressive pressure rise at the time of the ignition without an abrupt change in the slope of the pressure-time curve.

While the phenomena of combustion are at present not sufficiently known to permit us to explain with absolute certainty, why this pressure rises is less abrupt in the case of a double injection than in a single injection, we believe that this may be due to the fact that the first fine droplets of injected fuel are inflamed more rapidly when in contact with already partly oxidized fuel compounds, whereupon the flame is propagated in one direction through the fuel jet of the secondary injection, and in the other direction through the carbureted mixture itself which burns progressively.

The above-mentioned limits of the range in which the ratio of the carbureting fraction of the injected fuel charge to the "igniting" fraction may vary, namely between 1:4 and 1:2, depend on the fact that the injection of a larger carbureting fraction would provoke the well-known knocking of the motor which is so detrimental to the good mechanical functioning of the latter while a ratio smaller than about 1:4 does not reduce the ignition lag sufficiently and leads to an abrupt pressure rise at the instant when ignition occurs.

The exact ratio between the carbureting and the igniting fraction of the total fuel charge depends also on the type of fuel used so as to combine optimal output with greatest smoothness of operation.

For a given engine having a determined opening time of the air intake valve and a determined working speed, and for a given fuel to be used in that engine, three variables have to be considered in order to determine the optimal conditions for achieving a satisfactory combustion according to the method of our invention:

(1) The timing of the main injection of the "igniting fraction" relative to the work cycle of the engine;

(2) The ratio of the carbureting to the igniting fraction, i.e. what portion of the total charge is to be injected by the first injection and what portion by the main injection;

(3) The timing of the injection of the carbureting fraction relative to the work cycle while residual hot gases are present in the cylinder, the spacing between the first and the main injection being determined by the difference between (1) and (3).

Our invention will be further illustrated by a number of examples which are of course not to be considered limitative of the scope of the invention in any way or form, and by the accompanying drawings in which:

Figure 1A is another diagram on the basis of Example I, showing the magnitudes of (1) the pressure maximum, (2) the average increase in pressure per degree, (3) ratio of (1) to (2) depending on the ratio of primary to secondary injection according to the method of the invention.

Figures 2 to 10 are similar diagrams as Figure 1 illustrating Examples II to X respectively. Figure 4A is another diagram of the same type as 1A but corresponding to a gas-oil charge.

Figure 13 is a sectional view of a camshaft-injection valve system adapted for controlling the ignition of fuel according to our invention. Figures 14 and 15 show two other devices for practicing the method of double injection according to the invention.

The examples given hereinafter illustrate the influence of the three above-mentioned variables on the output as well as the slope of the pressure rise in the operation of a determined engine operated by the method according to our invention. The engine selected to serve for carrying out the subsequent examples is characterized by the following data:

It is a four-stroke diesel type engine having two cylinders aligned in parallel, a power of fifty international hp. at a speed of 1250 r.p.m., and each cylinder has a bore of 150 millimeters and a stroke of 180 millimeters, the compression rate being 15.

The distribution of the engine is so regulated that the opening and closing of the air intake valve take place respectively at 12° prior to top center and 36° after bottom center and that the opening and closing of the exhaust valve take place respectively at 36° prior to bottom center and 12° after top center.

Figure 11:
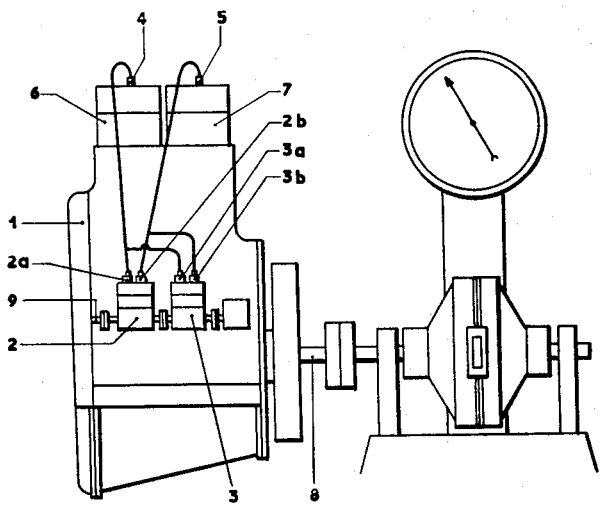
Figure 11 is a schematical view of an engine having a fuel supply system adapted for carrying out the method according to the invention.

The engine is equipped with two injection pumps 2 and 3 of the direct injection type each having two cylinders 2a and 2b and 3a and 3b, respectively, by means of which the two types of fuel injection according to the method of our invention are effected. The fuel injection system is illustrated in Figure 11, the injectors 4 and 5 of the engine, each of which supplies fuel to one of the cylinders 6 and 7, being fed in parallel with fuel from pumps 2 and 3.

Pressure diagrams as a function of the angle of rotation of the crankshaft 8 are recorded by means of a strobocathodic manograph, thereby permitting to observe the influence of the parameters of adjustment of the two injections on the performance of the engine and the progressive development of combustion. Smoke density is recorded according to the Shell method which consists in evaluating the blackening of a filter paper of determined surface area by the passage therethrough of a determined volume of burned gases.

EXAMPLE I

The motor described hereinbefore is operated at full charge with common gasoline having an octane number of 80 (research method), and is caused to rotate at 1250 r.p.m. The primary injection according to the invention is timed at a position of the crankshaft being 360° prior to the top center of the compression stroke (in the vicinity of which top center combustion takes place), and the secondary injection of the remaining or "igniting" charge is done toward the end of the compression stroke, at a position of the crankshaft of 20° prior to the same top center.

The amount of gasoline constituting the carbureting charge, i.e. the charge first injected, amounts to 16% of the total charge introduced into the engine per workcycle.

EXAMPLE II

Example I is repeated, but the primary charge amounts to 30% of the total charge injected at each work cycle. A corresponding pressure curve is plotted in the diagram of Figure 1 and designated by $A_{30}$.

EXAMPLE III

Example I is repeated, but the primary charge amounts to 39% of the total charge injected at each work cycle. A corresponding pressure curve is plotted in the diagram of Figure 1 and designated by $A_{39}$.

EXAMPLE IV

Example I is repeated, but the primary charge amounts to 50% of the total charge injected at each work cycle. A corresponding pressure curve is plotted in the diagram of Figure 1 and designated by $A_{50}$.

EXAMPLE V

Figure 1:
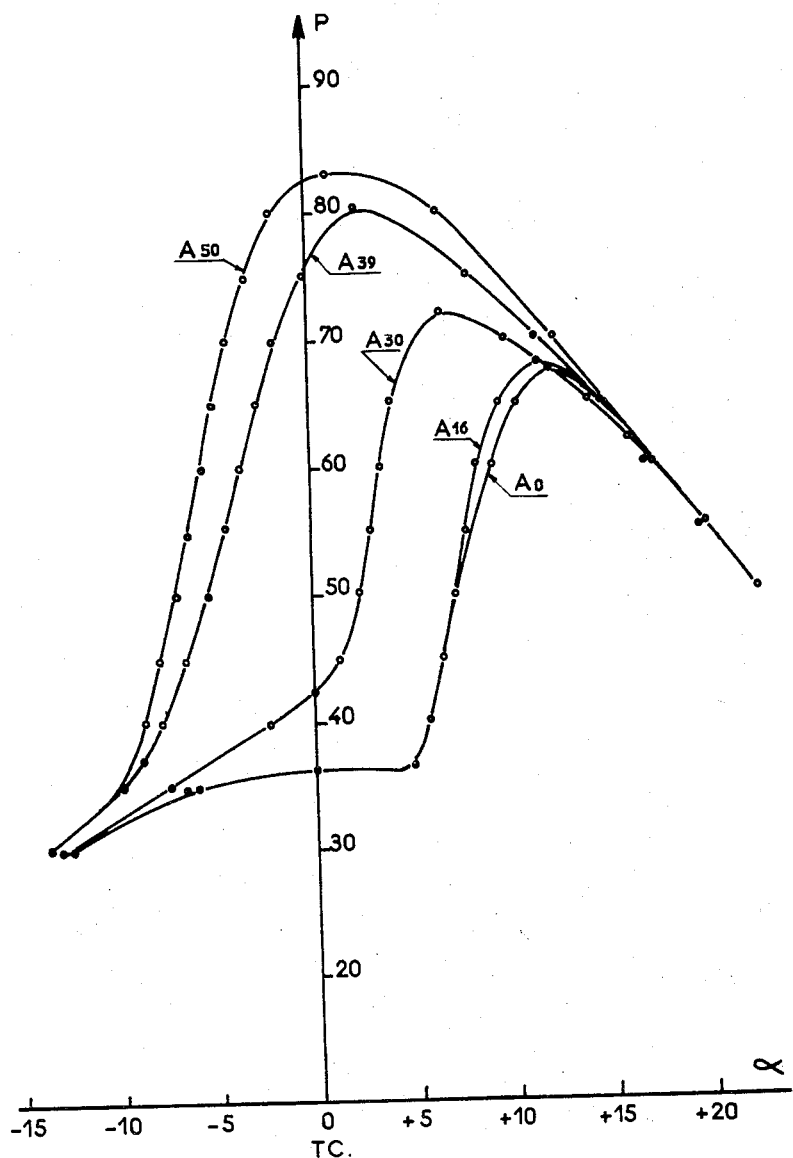
Figure 1 represents a pressure time diagram in which the region of the top center position of the crankshaft is shown, the abscissa or time axis showing the successive angular positions of the crankshaft and the ordinate showing the pressure values in kilograms per square centimeter (kg./cm.$^2$); this diagram illustrates Example I.

For the sake of comparison, the entire charge is introduced in a conventional manner in a single injection effected at the same time when, in the method according to our invention, the secondary injection would take place. There is thus no primary injection, and, consequently, the amount of carbureting charge is 0%. Curve $A_0$ in Figure 1 illustrates the changes in pressure and shows the undesirable, abrupt rise in pressure at the instant of ignition approximately at a crankshaft position of 5° after top center.

A comparison of curves $A_{16}$, $A_{30}$, $A_{39}$ and $A_{50}$ with curve $A_0$ clearly shows the reduction of the ignition lag together with the increase achieved in pressure above the maximum compression at top center without ignition and therewith in power output and the occurrence of the pressure maximum when the ratio of the pre-injected charge $M_1$ to the subsequently injected main charge $M_2$ exceeds 30:100.

In the case of a single injection, ignition takes place at about 5° after top center which represents an ignition lag correspondnig to an angle of rotation of the crankshaft of about 25° and the maximum pressure is produced only at a position of the crankshaft of about 12° after top center.

If the share of the primary injection of the total charge ranges from 16 to 30%, which latter amount is already beyond the maximum share of the pilot charge in the known methods of pilot injection, the decrease of the ignition lag is only about 5° while the increase of the pressure maximum is only about 5 kg./cm.² By increasing the share of the primary charge to about 40 to 50% of the total fuel amount consumed, it is possible to reduce the ignition lag by about 15° to approximately 10°.

As will be seen from the curves in Figure 1A, the changes in phenomena due to the decrease of the ignition lag, are most pronounced from curve $A_{30}$ to $A_{39}$ than from curve $A_{39}$ to $A_{50}$. The curves of Figure 1 and Figure 1A confirm our discovery that with a gasoline charge and the two injections respectively positioned at 360 and 20° prior to top center unexpectedly good results are achieved as well from the point of view of a smooth increase in pressure as from the point of view of obtaining a satisfactory pressure maximum since the ratio of the maximum pressure to the average increase in pressure per degree of rotation of the crankshaft goes continuously raising for shares of the primary charge from 15% up to 50%. However, in this particular case and with the particular engine used the rate of increase of said last mentioned ratio becomes smaller for shares of the primary injection from 39 up to 50%.

Curves $A_{39}$ and $A_{50}$ show that the pressure maximum is attained at a crankshaft position of only 1° to 2° after top center i.e. at an almost ideal time.

The reduction in the ignition lag, due to an appropriate timing of the first injection according to this invention, whereby the beginning of ignition is shifted from the immediate vicinity of top center position to about 10° prior to top center, while the time of the secondary or main injection is advanced to about 20° prior to top center instead of the conventionally recommended 5° to 8°, permits to obtain the advantage of a very smooth running of the motor better than that achieved by the conventional pilot injection, while permitting at the same time to reach maximum pressure in the vicinity of 85 kg./cm.² practically at top center position of the crankshaft, which corresponds to an unexpected improvement of engine output hitherto unachieved by the conventional methods of double injection.

As has been mentioned before, for a given power of the engine, the efficiency of the latter varies with the ratio of the carbureting to the igniting charge.

The following Table I illustrates, always on the basis of Example I, the change in engine efficiency expressed in grams of fuel consumed per H.P. and hour depending on the change of the ratio $M_1:(M_1+M_2)$.

*Table I*

| Ratio $M_1:(M_1+M_2)$ in percent: | Fuel consumption index (base 100 for single injection) |
|---|---|
| 0 | 100 |
| 20 | 96.5 |
| 30 | 94 |
| 40 | 93 |
| 50 | 93.5 |

The above table shows that optimal engine efficiency is achieved with a primary injection of a carbureting charge amounting to above 30% up to 50% of the total fuel charge injected at each work cycle. The advantages of the above range in the ratio $M_1:M_2$ are also confirmed by the corresponding smoke index, as shown in Table II.

*Table II*

| Ratio $M_1:(M_1+M_2)$ in percent: | Smoke index |
|---|---|
| 0 | 5.5 |
| 20 | 4.5 |
| 30 | 3.0 |
| 40 | 2.5 |
| 50 | 2.0 |

A comparison of both tables and the diagrams of Figures 1 and 1A show that optimal results are indeed obtained if the share of the primary charge in the total fuel charge is between 40 and 50%. In the following Examples V and VI these two proportions have therefore been applied under the same conditions as in Examples I to IV, however at different working speeds of the motor.

EXAMPLE V

The above described engine is operated under the same conditions as described in Example I in particular with regard to the timing of the primary and the secondary injections at 360° and 20° prior to top center position at the end of the compression stroke, however at an engine speed at 1,000 r.p.m. which corresponds to a power of 40 H.P. (international).

The ratio of $M_1:(M_1+M_2)$ is chosen first at 40% and then at 50%. The resulting pressure curves $B_{40}$ and $B_{50}$ are shown in Figure 2.

Figure 2 also shows curves $B'_{40}$ and $B'_{50}$ which correspond to a fuel supply of three quarters of the amounts of each charge.

A comparison of these curves shows that operating conditions similar to those in Example I can be obtained by the method according to the invention at a different engine speed and even with a partial fuel supply to the engine.

EXAMPLE VI

The engine described above is operated under the same conditions as in Examples I and II, however at a speed of 1500 r.p.m. which corresponds to a power of 60 H.P.

Curves $C_{40}$ and $C_{50}$ in Figure III correspond, respectively, to the same primary injection ratio as in Example II, at full charge, while curves $C'_{40}$ and $C'_{50}$ correspond again to a ¾ charge.

The comparison of the curves of Figures I, II and III reveals that the method of double injection under the conditions of our invention in the case of a gasoline fuel is independent of the working speed of the motor.

EXAMPLES VII–XIV

The engine described above is operated under the same conditions as in Example I; however, the fuel used is a diesel oil having a cetane number of 50–55.

These examples were carried out with a single injection for the sake of comparison (Example VII; $M_1:(M_1+M_2)=0\%$, and with primary injection shares of 20, 30, 35, 40, 42, 50, and 57%.

Figure 4:
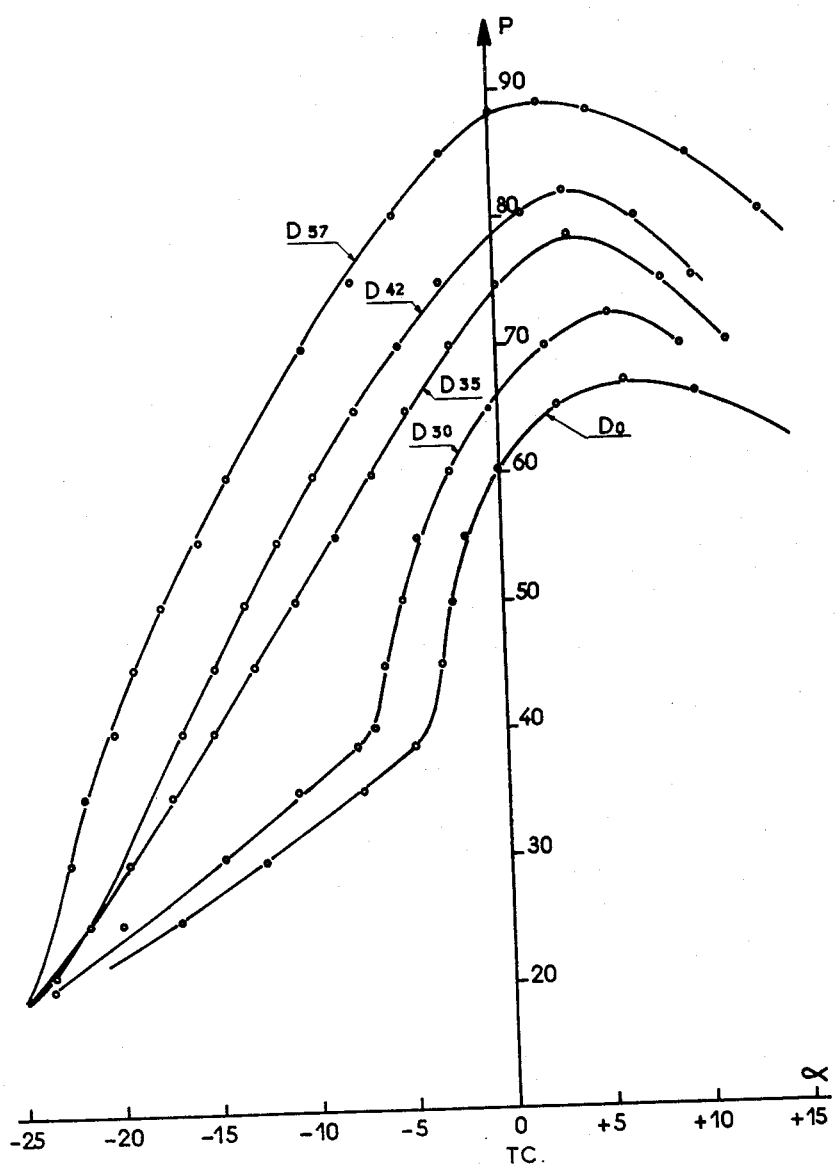

The results are compiled in Table III which indicates, which share of the primary injection was used in each example and which curve in Figure 4 describes the changes in pressure occuring in the top center region at the end of the compression stroke, as well as the timing of the ignition point and the pressure maximum both expressed by the angular position of the crankshaft relative to the top center, and the height of the pressure maximum in kg./cm.$^2$, furthermore, the fuel consumption rate in grams per H.P.-hour and the smoke index.

*Table III*

| Example No. | $\frac{M_1}{M_1+M_2}$, Percent | Press. Curve, Fig. 4 | Ign. lag (°) | Timing of Press., Max. (Degrees) | Maxim. Pressure, kg./cm.$^2$ | Fuel Consumption index [1] | Smoke Index |
|---|---|---|---|---|---|---|---|
| VII | 0 | $D_0$ | 16 | +7 | 67 | 100 | 7.0 |
| VIII | 20 | | | | | 97 | 3.0 |
| IX | 30 | $D_{30}$ | 13 | +6 | 72 | 95 | 2.7 |
| X | 35 | $D_{35}$ | −0 | +4 | 78 | 98 | 3.0 |
| XI | 40 | | 0 | +4 | 80 | 100.5 | 3.2 |
| XII | 42 | $D_{42}$ | −0 | +3.5 | 82 | 101.5 | 3.5 |
| XIII | 50 | | −3 | +2 | 84 | 106 | 4.1 |
| XIV | 57 | $D_{57}$ | −5 | +2.5 | 89 | 112 | 4.4 |

[1] Index based on: fuel consumption in the case of a single injection=100.

A comparison of the curves of Figure 4 with each other and with those of Figure 1, and of the other data given in Table III confirms our above-mentioned discovery, that a primary injection rate of 30% of the total fuel charge is a proportion close to and beyond which optimal results can be obtained with regard to reducing the ignition lag increasing engine output and, on the other hand, a minimum in fuel consumption and smoke index. When seeking a compromise between these various factors the best operating conditions for the above described engine with gas oil are obtained at a primary injection rate of 30% up to 35%. In fact, fuel consumption and smoke formation show a minimum, if the carbureting charge amounts to about 30% of the total amount of gas oil assumed. On the other hand, a carbureting charge constituting 35% of the total fuel charge practically eliminates the ignition lag and thus assures a perfectly smooth operation of the engine. However Figure 4A shows that a smooth rise of pressure together with high maximum pressures are achieved with shares of the primary injection up to 57%.

EXAMPLE XV

Example IX is repeated under the same conditions except that the engine speed is 1,000 r.p.m. instead of 1,250 as in the case of Example IX. The former speed corresponds to a power of 40 H.P. Curve $E_{30}$ in Figure 5 illustrates the changes of pressure at full charge, while curve $E'_{30}$ illustrates these at ¾ charge. These curves show that the operation of the engine by the method according to our invention as illustrated by Examples VIII to XII, is independent of the engine speed, while the specific fuel consumption rate is practically the same at both 1,000 and 1,250 r.p.m.

EXAMPLE XVI

Example IX is repeated, however at an engine speed of 1500 r.p.m. corresponding to a power of 60 H.P. Curve $F_{30}$ in Figure 6 illustrates the changes in pressure occurring when the double injection according to the method of our invention is injected with full charge, while curve $F'_{30}$ illustrates the same changes when double injection is carried out with a ¾ charge. We have found again that the same advantages as in Example IX are obtained at the higher speed of the present example without changing the specific fuel consumption rate.

EXAMPLES XVII–XX

Example I is repeated by operating the above described engine at 1250 r.p.m. with a gasoline fuel having an octane R.M. number of 80. Equal amounts of fuel are injected as carbureting and igniting charges, the rate of the primary injection $M_1:(M_1+M_2)$ thus being equal to 50%.

While the timing of the secondary injection, i.e. that of the igniting charge is the same as that of Example I, i.e. at the time when the crankshaft position is 20° prior to top center at the end of the combustion stroke, the injection time of the primary injection is varied and corresponds to 340°, 360° and 380° prior to the same top center (Examples XVIII, XIX and XX). In Example XVII the entire fuel charge is introduced, for the sake of comparison, in a single injection at the time (20° prior to top center) at which the secondary charge would take place according to the method of our invention.

Curves $G_{20}$, $G_{340}$, $G_{360}$ and $G_{380}$ in Figure 7 illustrate the pressure changes resulting from the operation of the engine according to Examples XVII to XX. The results of these examples are also illustrated in Table IV below.

work cycle which phase difference amounts to 360°. The timing of the two injections relative to the phases of the work cycle is varied while all other conditions are the same as in the preceding three examples.

In Example XXI the primary injection is effected when the angle of rotation of the crank shaft is 378° prior to top center position at the end of the combustion stroke, while the secondary injection takes place at 18° prior to the same top center, the phase difference between the two injections being 360°.

In Example XXII the respective angles are 382° and 22° prior to top center.

The corresponding pressure curves $H_{378}$ and $H_{382}$ are illustrated in Figure 8 and show the influence exercised on the combustion phenomena by the slight shift in the timing of the two injections. It should be noted, that curve $H_{382}$ shows no sudden increase of pressure at the point of ignition and reaches a maximum which is about 8 kg./cm.² higher than that of curve $H_{378}$.

It should be borne in mind that the share of the primary injection charge is 50%.

EXAMPLES XXIII AND XXIV

The above described engine is operated under the same conditions as in Examples XXI and XXII, however, gas oil is used as fuel.

Figure 9:
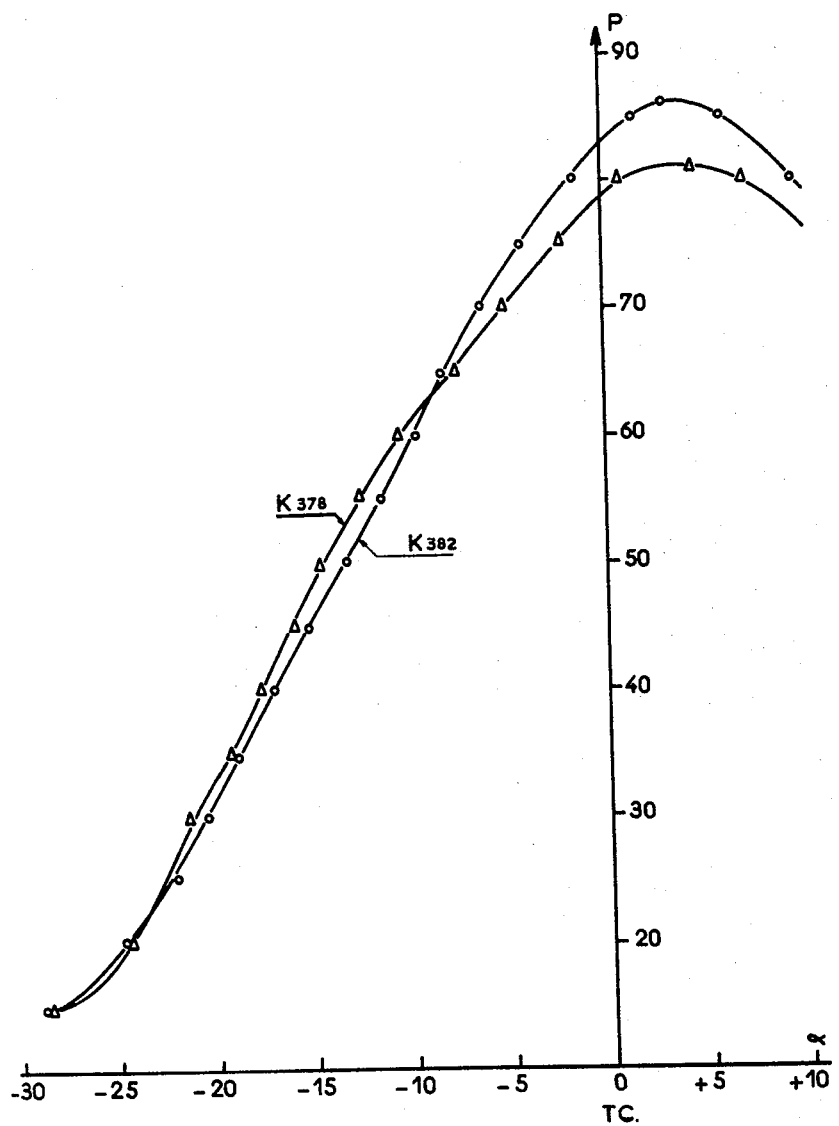

The primary injections take place at 378° (Example XXIII) and at 382° (Example XXIV) prior to top center, and the secondary injections follow after a phase lag of 360°. Curves $K_{378}$ and $K_{382}$ in Fig. 9 illustrate the pressure changes occurring during the operation of the engine according to the respective examples. These curves show that similar to those of Figure 8 the secondary injection of gas oil as a fuel and at an angle of 22° prior top center leads to a smoother rise of the pressure curve to a higher maximum.

*Table IV*

| Example No. | $\frac{M_1}{M_1+M_2}$, Percent | Press. Curve in Fig. 7 | Ignition Lag | Timing of Press., Max. | Maxim. Press, kg./cm.² | Fuel Consumpt. index | Smoke Index | Timing of Primary Inject. |
|---|---|---|---|---|---|---|---|---|
| | | | | Degrees | | | | Degrees |
| XVII | 0 | $G_{20}$ | 25 | +12 | 68 | 100 | 3 | None |
| XVIII | 50 | $G_{340}$ | 14 | +2 | 88 | 95 | 1.0 | −340 |
| XIX | 50 | $G_{360}$ | 10 | +1.5 | 83 | 93 | 2.0 | −360 |
| XX | 50 | $G_{380}$ | 8 | +2 | 78 | 93 | 3.2 | −380 |

The curves of Figure 7 confirm the advantageous operational conditions such as a gradual slope of the rising pressure, the reduction of the ignition lag and the increase of engine efficiency obtainable by a phase difference between the two successive injections according to the method of our invention, which phase difference ranges from about 320 to 360 degrees of rotation of the crankshaft, so that the injection of the carbureting fraction always occurs into the residual hot gases at the end of the exhaust stroke.

In selecting the exact phase difference, i.e. in timing exactly the primary injection when all other conditions remain unchanged, the various factors shown in Table IV should be considered, i.e. not only the ignition lags determining the slope of the pressure curves, but also the specific fuel consumption and the smoke indices.

EXAMPLES XXI AND XXII

The above described engine is operated in the same manner as described in Examples XVIII to XX with the same type of gasoline fuel and at a constant phase difference between the first and the second injection of each

EXAMPLE XXV

The engine is operated at a speed of 1250 r.p.m. with a fuel consisting of kerosene injected in two successive fractions of 50% each. The carbureting injection is timed to occur when the crank shaft is at a position of 380° prior to top center at the end of the compression stroke, and the igniting injection is timed to occur at 20° prior to the same top center.

The pressure change resulting from this operation of the engine according to the method of the invention is illustrated by curve $L_1$ in Figure 10 at full charge, while curve $L_2$ illustrates operation at a ¾ charge.

The comparison of these curves with those of Figure 10 shows that the operational conditions under the method according to the invention are valid for gasoline as well as for kerosene. In the latter case, the gas mixture in the combustion space shows a tendency to become ignited slightly before the secondary injection occurs and causing a more abrupt rise of the pressure curve. These characteristics due to the combustion of kerosene as fuel are improved by employing a ¾ charge instead of a full charge. This is confirmed by the fact that the specific fuel consumption is 195 gram/H.P.×hours at full charge compared with only 180 gram/H.P.×hours at ¾ charge.

EXAMPLE XXVI

The above described engine is operated at 1250 r.p.m. corresponding to a power, at full charge, of 50 H.P. The two injections according to the method of the invention occur at 360° and 20° respectively, prior to top center, each injection introducing 50% of the total fuel charge. The fuel used is a high octane gasoline having an octane R.M. number of 90.

In spite of the high octane number of this fuel, satisfactory conditions of operation are obtained which comprise a decrease of the ignition lag to 12 degrees of rotation of the crank shaft.

The aforegoing examples show that the reactions of partial cracking and oxidation occurring in the carbureting charge introduced by the primary injection into the hot residual gases can be controlled and their intensity steered according to the method of our invention by timing the two injections properly with the timing of the closure of the exhaust valve and the opening of the air intake valve.

According to another feature of the method of our invention it is possible to regulate the quantity of residual gas present in the combustion space toward the end of the exhaust stroke by a corresponding choice of the time interval between the carbureting primary injection and the closure of the exhaust valve, whereby the intensity of the desired heat exchange between the residual gases and the wall of the combustion space, on the one hand, and the injected carbureting fuel portion, on the other hand, leading to a partial cracking of the carbureting portion as well as the degree of oxidation of that fraction can be influenced, but it is still more the timing of the injection of the carbureting fuel portion relative to the opening of the air-intake valve that influences the cracking and oxidizing reactions and allows to control their intensity and length. For it is the opening of the intake valve which permits air, at the temperature of the surrounding atmosphere to penetrate into the combustion space and provoke a rapid temperature decrease of the gaseous mixture which terminates the various chemical reactions. When determining the exact conditions of operation of a given engine according to the method of our invention and on the basis of the examples given hereinbefore, it is necessary to seek a comprise between the advantages resulting from the improvement of the combustion characteristics with regard to engine output as well as with regard to smoothness of pressure rise, on the one hand, and the disadvantages that may result from a deficient filling of the combustion space with air, on the other hand.

The various measures of the method according to the invention for improving the smoothness of operation of compression ignition engines and the characteristics of the combustion process can be adjusted to each different type of such engines and to each utilized carburant. These measures permit to operate the aforesaid types of internal combustion engines without requiring major changes in the latter, with a great variety of carburants and fuels, such as, for instance, high octane gasoline. Simultaneously, these measures improve the combustion by reducing the smoke density (the smoke index determined under the operational conditions according to the invention remains between the limits 1 and 5), and increase the power output for a given smoke density limit by permitting an improved utilization of the air charge. These measures further permit to attain an increase in the working speed of engines having cylinders of large bores due to the effective reduction of the ignition lag, and to reduce noticeably the injection pressure due to the improved conditions for igniting the charge.

The double injection method according to our invention can be effected with various embodiments of apparatus adapted for effecting two successive introductions of fuel into the same cylinder of a compression ignition engine with a time lag between the two injections and a desired dosage of the respective fuel amounts injected.

One of these embodiments illustrated in Figure 11 has already been described above and comprises two injection pumps each of which has the same number of cylinders as the engine. These pumps are controlled by a command system such as a cam shaft 9 of known type, which system is provided with means for adjusting at will, and as a function of the type of fuel used, the ratio of fuel amounts introduced respectively by the first carbureting injection and the second igniting injection, as well as concurrently the angle of phase lag between the two successive injections directed into the same cylinder.

Figure 12:
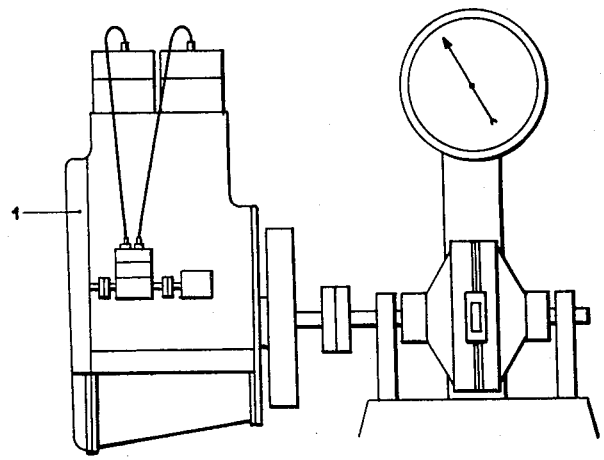
Figure 12 is a schematical view of an engine having a fuel supply system adapted for carrying out a known method envolving a single fuel injection per work cycle of each cylinder.

Figure 12 shows a similar engine fitted out with a fuel pump for conventional single injection for the sake of comparison.

The use of two injection pumps has the advantage of permitting a simple adjustment of the control system, whereby the latter can be adjusted as described above, so that the engine can be operated with any type of fuel under optimal combustion conditions.

Various other embodiments achieving the same goal are possible. Thus, a simple solution which avoids the necessity of using two injection pumps consists in providing an appropriate cam shaft for the injection pump, whereby the phase angle between the two successive injections for the same cylinder is determined. This solution requires, however, that the same fixed ratio in the amounts of fuel injected as a first carbureting portion and a second igniting portion as well as the phase lag between these two injections remains fixed, so that these two factors can no longer be adjusted in a particular engine to a different type of fuel to be used.

Such a result is achieved with an arrangement illustrated in Figure 13 in which a conventional injection pump 10 is operated at half the speed of the crankshaft by coupling the cam shaft 11 of the injection pump 10 by suitable known means, such as a reducing gear transmission to the crank shaft (not shown). Cam shaft 11 bears for each injector 12 a cam 13 comprising two lobes 14 and 15 which are disposed symmetrically or at an angular displacement relative to each other, which angle is taken in a plane perpendicular to the cam shaft axis. In Figure 13 the angle between lobes 14 and 15 is 170° and is half the angle of phase lag desired between the two successive injections, which is thus 340°. The two injections will be effected by first one and then the othere of cam lobes 14 and 15 lifting the injector body 12, while the crank shaft effects a rotation of about an angle of 340°.

Another embodiment of apparatus for carrying out the method according to our invention is simple to realize and comprises the use of a normal injection pump without any changes of the cam shaft. This injection pump is coupled to the crank shaft by intermediary transmission means, whereby the latter means rotate at the speed of the crank shaft and effect two injections of equal amounts of fuel per work cycle, which two injections are separated by a time interval corresponding to a duration of a full revolution of the crank shaft about 360°. Such an embodiment is shown in Fig. 14 where a speed change gear 16 is adapted to double the speed of the camshaft as compared to the speed of shaft 17.

A similar result may also be obtained by means of a pump, comprising several cylinders, the number of which is twice that of the cylinders of the engine (see Figure 15). This pump is usually operated by being associated with a rotary means rotating at half the speed of the crank shaft. In this case, each injector is connected to two cylinders of the pump which are actuated under a phase lag corresponding to a rotation of the crank shaft about an angle of 360°. The two types of control systems shown in Figures 13 and 15 permit the use of the normal control and adjusting means of a conventional injection pump.

The arrangement illustrated in Figure 13 suffers from the drawback that adjustment to a different type of fuel may require an exchange of the cam shaft against another one having cam lobes displaced under a different angle.

Independently of the apparatus used, the method according to our invention, comprising two successive injections of the conditions described, enables compression ignition type internal combustion engines to operate with a great variety of fuels ranging from high octane gasolines to fuel oils of the diesel or gas oil type, while at the same time improving the combustion conditions of the last mentioned conventional fuels for compression ignition engines.

By facilitating the rapid ignition of the combustible mixture, the double injection according to the method of the invention permits to attain a given output with engines of lower compression rate than those presently required, which fact leads to a decrease of manufacturing and maintenance costs.

Furthermore, apart from the above-mentioned advantages, the double injection method according to our invention also reduces the noise and vibrations of the single injection type engines which the known methods, such as the pilot injection method, have been devised to overcome.

It will be understood that while there have been given herein certain specific examples of the practice of this invention, it is not intended thereby to have this invention limited to or circumscribed by the specific details of the materials, proportions or conditions herein specified, in view of the fact that this invention may be modified according to individual preference or conditions without necessarily departing from the spirit of this disclosure and the scope of the appended claims.

What we claim is:

1. In a method for improving the operation of a compression ignition type internal combustion engine having at least one cylinder, one piston and a crankshaft, with a work cycle comprising an intake, a compression, an expansion and an exhaust stroke; and, associated with each cylinder, fuel injection means, air intake valve means and exhaust valve means; the work cycle occurring at every two revolutions of said crankshaft; the steps, in combination, of firstly injecting a first portion of a total fuel charge to be injected into each of said cylinders during each work cycle into the hot residual burnt gases in the cylinder at the end of the exhaust stroke of the preceding work cycle, and secondly injecting the remaining portion of said fuel charge into the cylinder during the compression stroke of the work cycle.

2. In a method for improving the operation of a compression ignition type internal combustion engine having at least one cylinder, one piston and a crankshaft, the work cycle of said piston comprising an intake, a compression, an expansion and an exhaust stroke; and, associated with each cylinder, fuel injection means, air intake valve means and exhaust valve means, said work cycle occurring at every two revolutions of said crankshaft, the steps, in combination, of firstly injecting a first portion of a total fuel charge to be injected into each of said cylinders during each work cycle into the hot residual burnt gases in the cylinder at the end of the exhaust stroke of the preceding work cycle, and secondly injecting the remaining portion of said fuel charge into the cylinder toward the end of the compression stroke of the work cycle.

3. In a method for improving the operation of a compression ignition type internal combustion engine having at least one cylinder, one piston and a crankshaft, the work cycle of said piston comprising an intake, a compression, an expansion and an exhaust stroke; and, associated with each cylinder, fuel injection means, air intake valve means and exhaust valve means, said work cycle occurring at every two revolutions of said crankshaft, the steps, in combination, of firstly injecting a first portion of a total fuel charge to be injected into each of said cylinders during each work cycle into the hot residual burnt gases in the cylinder at the end of the exhaust stroke of the preceding work cycle, and secondly injecting the remaining portion of said fuel charge into the cylinder toward the end of the compression stroke of the work cycle and adjusting the time interval between the first and the second injection in such a manner as to control the intensity of the chemical reactions occurring in the combustible mixture resulting from the first injection at such a rate that the ignition lag of the mixture after the second injection is substantially reduced.

4. The method according to claim 1, wherein the time difference between the first and the second injection corresponds to an angle of rotation of said crank shaft of about 320 to 360 degrees.

5. In a method for improving the operation of a compression ignition type internal combustion engine having at least one cylinder, one piston and a crank shaft, the work cycle of said piston comprising an intake, a compression, an expansion and an exhaust stroke; and, associated with each cylinder, fuel injection means, air intake valve means and exhaust valve means said work cycle occurring at every two revolutions of said crank shaft, the steps, in combination, of firstly injecting a first portion of a total diesel fuel charge to be injected into each of said cylinders during each work cycle into the hot residual burnt gases in the cylinder at the end of the exhaust stroke of the preceding work cycle and secondly injecting the remaining portion of said fuel charge into the cylinder toward the end of the compression stroke of the work cycle.

6. In a method for improving the operation of a compression ignition type internal combustion engine having at least one cylinder, one piston and a crank shaft, the work cycle of said piston comprises an intake, a compression, and expansion and an exhaust stroke; and, associated with each cylinder, fuel injection means, air intake valve means and exhaust valve means, a work cycle at every two revolutions of said crank shaft, the steps, in combination, of firstly injecting a first portion of a total kerosene charge to be injected into each of said cylinders during each work cycle into the hot residual burnt gases in the cylinder at the end of the exhaust stroke of the preceding work cycle, and secondly injecting the remaining portion of said fuel charge into the cylinder toward the end of the compression stroke of the work cycle.

7. In a method for improving the operation of a compression ignition type internal combustion engine having at least one cylinder, one piston and a crank shaft, the work cycle of said piston comprising an intake, a compression, an expansion and an exhaust stroke; and, associated with each cylinder, fuel injection means, air intake valve means and exhaust valve means, a work cycle at every two revolutions of said crank shaft, the steps, in combination, of firstly injecting a first portion of a total gasoline charge to be injected into each of said cylinders during each work cycle into the hot residual burnt gases in the cylinder at the end of the exhaust stroke of the preceding work cycle, and secondly injecting the remaining portion of said fuel charge into the cylinder toward the end of the compression stroke of the work cycle.

8. The method described in claim 1 wherein the first injection occurs when the position of the crankshaft is from 340° to 380° before the top center of the compression stroke.

9. The method described in claim 1 wherein the second injection occurs when the position of the crankshaft is at least 10° before the top center of the compression stroke.

10. The method described in claim 1 wherein the fuel consists of gasoline and the first portion of said fuel charge constitutes from about 30% to 50% of the total fuel charge.

11. The method described in claim 1 wherein the fuel consists of diesel fuel and the first portion of said fuel charge constitutes from about 20% to 45% of the total fuel charge.

12. The method as described in claim 1 wherein the fuel used for each injection consists of gasoline.

13. The method as described in claim 1 wherein the fuel used for each injection consists of kerosene.

References Cited in the file of this patent

UNITED STATES PATENTS

| | | |
|---|---|---|
| 2,010,469 | Triebnigg | Aug. 6, 1935 |
| 2,012,086 | Mock | Aug. 20, 1935 |
| 2,030,086 | Woolson | Feb. 11, 1936 |
| 2,151,698 | Harper | Mar. 28, 1939 |